United States Patent [19]
Nelson et al.

[11] 3,784,409
[45] Jan. 8, 1974

[54] PROCESS FOR PURIFYING GLUCOSE SYRUPS CONTAINING FRUCTOSE

[75] Inventors: William Junior Nelson, Camanche, Iowa; Charles William Hinman, deceased, late of Fort Madison, Iowa by Roy W. Deitchler, administrator

[73] Assignee: Standard Brands Incorporated, New York, N.Y.

[22] Filed: June 1, 1971

[21] Appl. No.: 148,915

Related U.S. Application Data

[63] Continuation-in-part of Ser. No. 705,318, Feb. 14, 1968, abandoned.

[52] U.S. Cl. ............... 127/46 A, 99/142, 195/31 F
[51] Int. Cl. ............................................. C13k 9/00
[58] Field of Search ................. 127/46 R, 46 A; 99/142; 195/31 F

[56] References Cited
UNITED STATES PATENTS

| | | | |
|---|---|---|---|
| 3,306,752 | 2/1967 | Vedd | 99/142 |
| 2,753,279 | 7/1956 | Cushing | 127/46 A |
| 2,845,369 | 7/1958 | Davis | 127/46 A |
| 2,599,757 | 6/1952 | Gottfried | 127/46 A |
| 3,305,395 | 2/1967 | Scallet | 99/142 X |
| 3,616,221 | 10/1971 | Takasaki | 99/142 X |

*Primary Examiner*—Morris O. Wolk
*Assistant Examiner*—Sidney Marantz
*Attorney*—Aaron B. Karas et al.

[57] ABSTRACT

A method of purifying enzymatically isomerized glucose syrups containing fructose. These syrups contain salts which contribute to the ash content, colored bodies, odoriferous materials, and other impurities. To remove these impurities, the isomerized, glucose syrups are treated with a strong acid cation exchange resin in the hydrogen form which removes therefrom a portion of the colored bodies and appreciable quantities of the metallic constituents of the salts. Following this treatment, the syrups are subjected to a carbon treatment which removes the major portion of the colored bodies and odoriferous materials. The syrups are then treated with a weak base anion exchange resin in the free base form, a strong acid cation exchange resin in the hydrogen form, and with a strong base anion exchange resin in the hydroxyl form.

10 Claims, No Drawings

3,784,409

PROCESS FOR PURIFYING GLUCOSE SYRUPS CONTAINING FRUCTOSE

THE INVENTION

This Application is a continuation in part of patent application Ser. No. 705,318 filed Feb. 14, 1968, now abandoned.

This invention relates to a method of purifying glucose syrups containing fructose. More particularly, the invention relates to a process of purifying enzymatically isomerized glucose syrups containing fructose.

The major use of glucose and of corn syrups containing glucose, is in food processing, for example in the baking, beverage, canning and confectionery industries, to provide sweetness, body or to regulate crystal growth. However, because glucose inherently lacks a high degree of sweetness and has a relatively bland flavor, its uses are somewhat limited. This is overcome, to some extent, by mixing glucose or corn syrups with sucrose or invert syrups to enhance total sweetness. This has not proven entirely satisfactory, however, because of economic and other factors involved. It has been recognized that if during the production of corn syrups a significant proportion of the glucose can be converted to fructose, corn syrups will be provided that are sweet enough to satisfy additional purposes.

Glucose isomerase is an enzyme which converts or isomerizes glucose to fructose.

There are many microorganisms known in the art which produce glucose isomerase. For example, in an article appearing in Science, Vol. 125, pp. 648-9 (1957) it is disclosed that an enzyme derived from *Pseudomonas hydrophila* will isomerize glucose to fructose. Also, British Patent 1,103,394 and Japanese Patent 7428 (1966) to Takasaki et al disclose that microorganisms classified as belonging to the *Streptomyces* genus, such as *Streptomyces flavovirens*, *Streptomyces achromogenes*, *Streptomyces echinatus* and *Streptomyces albus* produce glucose isomerase. There are many other microorganisms which are disclosed in the art as producing glucose isomerase. A few of these other microorganisms disclosed are, for instance, *Aerobacter cloacae*, *Bacillus megaterium*, *Acetobacter suboxydans*, *Acetobacter melanogenus*, *Acetobacter roseus*, *Acetobacter oxydans*, *Bacillus fructose*, and *Lactobacillus fermenti*.

Enzymatically isomerized glucose syrups containing fructose have appreciable quantities of salts present which contribute to the ash content of the syrups, colored bodies, potential color-forming bodies, undesirable flavors, and odoriferous materials. The taste sensation imparted to the syrups by the undesirable flavors is highly repulsive and perhaps can best be described as musty. The odor of the syrup may, also, be best described as musty. Moreover, there may be present quantities of other impurities such as proteinaceous materials, fats and waxes. To provide commercially acceptable enzymatically isomerized glucose syrups containing fructose, these impurities must be substantially removed so that the syrups are relatively colorless and bland in flavor.

Accordingly, it is the principal object of the present invention to purify enzymatically isomerized glucose syrups containing fructose in order to obtain syrups which have present extremely low concentrations of impurities.

This object, and other objects, may be attained by treating enzymatically isomerized glucose syrups containing fructose having salts present which contribute to the ash content of the syrups, colored bodies, potential color-forming bodies, flavoring materials, and odoriferous materials, with a strong acid cation exchange resin in the hydrogen form which removes a portion of the colored bodies and the metallic constituents of the salts which contribute to the ash content of the syrups, adjusting the pH of the syrup to a value below about 3, subjecting the syrups to a carbon treatment to remove the major portion of the colored bodies, odoriferous materials and flavoring materials, treating the syrups with a weak base anion exchange resin in the free base form to adjust the pH of the syrups upwardly, treating the syrups with a strong acid cation exchange resin in the hydrogen form to remove a portion of the remaining colored bodies and substantially all the remaining metallic constituents of the salts which contribute to the ash content of the syrups, and treating the syrups with a strong base anion exchange resin in the hydroxyl form, said treatment being carried out to provide syrups which are bland, substantially colorless and odorless.

The conditions under which an enzymatic isomerization process is performed affect the formation of impurities in the isomerized syrup. If the isomerization process is performed at relatively high temperatures and/or if the isomerization process is performed for relatively long periods of time, in order to obtain high yields of fructose, there will be greater amounts of impurities formed. Also, the amount of impurities contained in an isomerized glucose syrup containing fructose will be dependent, to some degree, on the prior treatment of the glucose syrup used in the isomerization process. For example, if prior to isomerization the glucose syrup is refined by techniques well known in the art to remove various impurities therefrom, the isomerized syrup will consequently contain lesser amounts of impurities. Conversely, if an unrefined, glucose syrup is isomerized, there will be a tendency for such a syrup to contain greater amounts of impurities. Some of these impurities may be removed from the isomerized syrup by filtration. Preferably, prior to filtration, the pH of the isomerized syrup is adjusted to a value of from about 4 to about 5, and most preferably to about 4.5. Within this pH range, the various proteinaceous and fatty impurities in the syrup may be removed more effectively. The filtration may be carried out by mixing the isomerized syrup with suitable quantities of a filter aid, for instance about 1 per cent by weight of Johns-Manville HYFLO diatomaceous earth, and filtering through any suitable filtering device.

Enzymatically isomerized glucose syrups containing fructose have a tendency to develop color upon standing, due to the color-forming bodies present. When the pH of the isomerized syrup is adjusted, for instance prior to filtration, to values from about 4 to about 5, and preferably about 4.5, color development is reduced. This pH adjustment may be accomplished by the addition of an acid, or, preferably, by adding to the syrup a portion of an isomerized syrup which has been acidified by hydrogen ion exchange, in a subsequent step in the purification process of the present invention. This method is preferred since no additional impurities are added to the isomerized syrup which must subsequently be removed therefrom. The filtered or unfiltered isomerized syrup is next treated with a strong acid cation exchange resin in the hydrogen form. Examples of such resins are marketed by Diamond Shamrock Company under the trade names of Duolite C-3 and Duolite C-25, by Rohm & Haas Company under the trade name of Amberlite 200 and by Dow Chemical Company under the trade name Dowex 50-W. This treatment removes most of the metallic constituents of the salts which contribute to the ash content of the syrup, some of the colored bodies, and substantially all the remaining proteinaceous impurities, such as amino acids, from the syrup.

The isomerized syrup is then acidified to a pH of below about 3. If this pH adjustment is not accomplished by the strong acid cation exchange treatment in the preceding purification step, sufficient acid should be added to lower the pH to a value below about 3. Generally, however, the preceding cation exchange treatment is performed under conditions such that the syrup is acidified solely by hydrogen ion exchange. If the pH of the syrup is partially adjusted with an acid such as HCl, the weak base ion exchange resin in the free base form used in a subsequent treatment step will be exhausted more rapidly than if the adjustment is made solely by hydrogen ion exchange.

The pH-adjusted, isomerized syrup is subjected to a carbon treatment, for instance by passing the syrup through a bed of activated granular carbon or slurrying the syrup with activated powdered carbon and removing the same by filtration. This carbon treatment will remove a major portion of the colored bodies, odoriferous and flavoring materials contained in the syrup. Typically, when using activated granular carbon a burn ratio of from about 1 to about 9, and most preferably about 7, is used. Burn ratio is defined as the pounds of granular carbon that must be reactivated per 100 pounds of syrup solids processed in order to obtain the desired degree of purification. Examples of suitable activated carbons are those marketed by Pittsburgh Activated Carbon Company under the trade names of Pittsburgh types CPG and SGL, and West Virginia Pulp & Paper Company under the trade names NuChar Types CEE and WV-L.

The carbon-refined, isomerized syrup is treated with a weak base anion exchange resin in the free base form. This step adjusts the pH of the syrup upwardly, for instance to a pH in the range of from about 3 to about 7, and typically to a value of about 6. As a consequence of this treatment, various acids in the syrup which were generated by the prior pH adjustment step are removed. Examples of suitable weak base anion exchange resins which may be used in this step are those marketed by Diamond Shamrock Company under the trade name of Duolite A-6, and Rohm & Haas Company under the trade name of Amberlite IRA-93.

Next, the syrup is treated with a strong acid cation exchange resin in the hydrogen form. This treatment removes a portion of the remaining colored bodies and substantially all the remaining metallic constituents of the salts which contribute to the ash content of the syrup. Suitable strong acid cation exchange resins are those marketed by Diamond Shamrock Company under the trade names of Duolite C-3 and Duolite C-25, by Rohm & Haas Company under the trade name of Amberlite 200, and by Dow Chemical Company under the trade name of Dowex 50-W.

Finally, the syrup is treated with a stong base anion exchange resin in the hydroxyl form. This treatment substantially removes all the remaining undesirable, odoriferous and flavoring materials from the syrup and improves the color stability thereof. Suitable strong base anion exchange resins are those marketed by Rohm & Haas Company under the trade name of Amberlite IRA-900, and by Dow Chemical Company under the trade name of Dowex 11.

Depending upon the character of the strong base anion exchange resin used in the preceding step, it may be desirable to next treat the syrup with a strong acid cation exchange resin in the hydrogen form. In some cases, as evidenced by the odor and flavor of the syrup, a small amount of amines may be present due to amine leakage of the strong base cation exchange resin. The presence of these amines is, of course, objectionable, and may be removed by treatment with a strong acid cation exchange resin in the hydrogen form. Examples of suitable strong acid cation exchange resins are those enumerated above.

The temperature of the isomerized syrup during the purification process of the present invention may vary. Preferably, however, the syrup is purified at a temperature of from about 37° to about 60° C. At higher temperatures excessive color development may be observed in the syrup during purification, and at lower temperatures the syrup will be rather viscous, and, consequently, will be difficult to process through beds of ion exchange resins and granular carbon.

It is a preferred embodiment of the present invention that the enzyme used to isomerize a glucose syrup be derived from microorganisms of the genus *Streptomyces* which produce glucose isomerase. Particularly suitable microorganisms are *Streptomyces* sp. ATCC 21175 and *Streptomyces* sp. ATCC 21176.

The microorganisms of the *Streptomyces* genus specifically identified above primarily produce glucose isomerase intracellularly. The glucose isomerase may be separated from the cells by a sonic treatment in an aqueous medium and the cells removed by filtration. The filtrate containing the glucose isomerase may be used to isomerize glucose in a glucose syrup. In commercial practice, however, it is economically undesirable to use such a costly procedure. Consequently, it is preferred that the cells be separated from a fermentation broth and be incorporated directly into a glucose syrup.

In an embodiment of the process of the present invention, sufficient quantities of filtered cells of *Streptomyces* sp. ATCC 21175, to provide the necessary glucose isomerase activity, are incorporated directly into a glucose syrup, for instance a corn syrup. The glucose in the glucose syrup is isomerized by maintaining the temperature of the syrup in the range of about 70° C and at a pH of from about 6.8 to about 7.2. During the isomerization, suitable quantities of glucose isomerase activators and stabilizers are present. When the desired yield of fructose is obtained, the isomerized syrup is purified in accordance with the purification process of the present invention. The Table below shows the effectiveness of the present purifying process in terms of removing the color bodies from five samples of syrups isomerized by the general procedure described above.

TABLE I

| Treatment Step | Color of the fructose-containing syrups after each treatment step as measured by Corn Refiners Association Incorporated Method F-14 at pH of 4.8 | | | | | pH of the fructose-containing syrups after each treatment step | | | | |
|---|---|---|---|---|---|---|---|---|---|---|
| | Samples | | | | | Samples | | | | |
| | 1 | 2 | 3 | 4 | 5 | 1 | 2 | 3 | 4 | 5 |
| Isomerized crude fructose-containing syrup (filtered) | 5.370 | 2.540 | 1.830 | 6.940 | 3.050 | 4.7 | 4.3 | 4.2 | 4.9 | 4.7 |
| Powdered carbon treatment (Nuchar CEE) (filtered) | 2.190 | 1.490 | 0.880 | — | 3.150 | 4.6 | 4.4 | 4.2 | 5.0 | 4.7 |
| Strong acid cation exchange treatment (Duolite C-3) | 1.870 | 1.190 | 0.570 | 2.670 | 1.820 | 1.2 | 1.2 | 1.2 | 1.2 | 1.2 |
| Granular carbon treatment (Pittsburgh Type CPG) | 0.102 | 0.097 | 0.030 | 0.142 | 0.131 | 1.5 | 1.4 | 1.4 | 1.3 | 1.3 |
| Weak Base anion exchange treatment (Duolite A-6) | 0.123 | 0.099 | 0.057 | 0.132 | 0.114 | 5.8 | 6.0 | 6.8 | 6.0 | 6.5 |
| Strong acid cation exchange treatment (Amberlite 200) | — | — | — | — | — | — | — | — | — | — |
| Strong base anion exchange treatment (Amberlite IRA-900) | — | — | — | — | — | — | — | — | — | — |
| Strong acid cation exchange treatment (Amberlite 200) | 0.000 | 0.006 | 0.003 | 0.005 | 0.001 | 4.3 | 4.5 | 5.2 | 5.3 | 4.2 |

From the above table, it is apparent that purifying enzymatically isomerized glucose syrups in accordance with the present invention, removes substantially all the colored bodies therefrom. It is a particularly preferred embodiment of the present invention that the glucose syrups containing fructose be treated so that the color thereof be below a value of 0.05, and preferably below a value of 0.01 when measured according to the Corn Refiners Association Incorporated Method F-14 at a pH of 4.8.

In order to more clearly describe the nature of the present invention, a specific example will hereinafter be described. It should be understood, however, that this is done solely by way of example and is intended neither to delineate the scope of the invention nor limit the ambit of the appended claims. In the Example and throughout this specification, percentages are utilized to refer to per cent by weight, unless otherwise specified.

In the following example, the determination of glucose isomerase activity of the enzyme preparation is based on a modification of the method disclosed in the Japanese Journal of Agr. Biol. Chem., Vol. 30 No. 12, pp. 1247–1253 (1966) by Y. Takasaki.

The modified method was performed as follows:
One ml of a sonicated, filtered fermentation broth containing about 10 units of glucose isomerase was incubated at a pH of 7.5 and at a temperature of 70° C in 9 ml of an aqueous medium containing the following per liter:
  0.1 Moles Glucose
  0.05 Moles $NaH_2PO_4$
  0.005 Moles $MgSO_4 \cdot 7H_2O$ After one hour, the pH of the reaction mixture was lowered to about 3 with a 5 per cent by weight perchloric acid solution in order to inactivate the glucose isomerase.

One milliliter of the reaction mixture, 0.2 milliliters of a 0.2 per cent cysteine hydrochloride solution, 5 milliliters of a 75 per cent $H_2SO_4$ solution by volume and 0.15 milliliters of 0.12 per cent carbazole in an alcoholic solution were placed in a test tube, mixed, and the test tube placed in a water bath maintained at 60° C. After 10 minutes the test tube was removed from the bath and cooled rapidly to room temperature. Light absorption of the solution at 560 m$\mu$ was measured and the fructose content of the sample determined. One glucose isomerase unit equals the formation of one milligram fructose under the conditions described above. Appropriate blanks were run to compensate for ketoses present in the enzyme preparation and those formed by alkaline isomerization.

EXAMPLE

This Example illustrates an embodiment of the method of the present invention.

Into 76.2 kilograms of a glucose syrup (first greens) having a solids concentration of 58.2 per cent by weight was incorporated 74.6 grams $MgSO_4 \cdot 7H_2O$ and 14.4 grams $CoCl_2 \cdot 6H_2O$. Eighty-two per cent of the solids was composed of glucose. Approximately 4.54 kilograms of a filter cake of *Streptomyces* sp. ATCC 21175 having a glucose isomerase activity of 80 glucose isomerase units per gram were incorporated into the glucose syrup. The syrup was maintained at a temperature of 70° C and a pH of 6.5 during the isomerization. The isomerization reaction was allowed to proceed for 69.5 hours. This syrup was diluted, and filtered by means of a Buchner funnel using about 2 percent Johns-Manville HYFLO diatomaceous earth.

The filtered syrup had a solids concentration of about 54 per cent. About 38 per cent of the solids was composed of fructose. The color, as measured according to the Corn Refiners Association Incorporated Method F-14 at a pH of 4.8, was 5.19. The ash content, measured by the Corn Refiners Association Incorporated Method F-6, was 0.54 per cent, dry substance basis. The proteinaceous material, as determined by the Corn Refiners Association Incorporated Method F-44, was 0.136 per cent, dry substance basis.

This syrup at a temperature of 43° C was passed through two one-inch diameter columns connected in series. Each column contained 30 inches of Duolite C-3 in the hydrogen form. When the pH of the effluent from the first column, rose from a value of about 1.6 to a value about 2, the column was removed from the system. The rise in the pH of the effluent indicated that the exchange resin was exhausted. Flow rate of the syrup through the columns was about 20 ml per minute.

The treated syrup was passed through five one-inch diameter columns containing a total bed depth of 22.5 feet of Pittsburgh Type CPG activated granular carbon. The weight of the dry granular carbon in each column was about 240 grams. Flow rate of the syrup through the columns was about 15 ml per minute. The temperature of the syrup during the treatment was about 55° C. The burn ratio of the carbon employed was 7.2.

The syrup was then passed through two one-inch columns connected in series. Each column contained 30 inches of Duolite A–6 in the free base form. When the pH of the effluent from the second column dropped to 5, the exchange resin in the first column was considered exhausted. Flow rate of the syrup through the columns was about 20 ml per minute. The temperature of the syrup during this treatment was 43° C.

Final purification included passing the syrup through a column one and one-eighth inches in diameter. This column contained 6 inches of Amberlite 200 in the hydrogen form. The syrup was then passed through another column one and one-eighth inches in diameter. The column contained 12 inches of Amberlite 900 in the hydroxyl form. The temperature of the syrup during these treatments was about 43° C. The flow rate of the syrup through these columns was 10 ml per minute.

Various effluents of the treatment steps were analyzed for color, per cent protein and per cent ash. The following table shows the results of these analyses.

TABLE II

| | Analysis of Syrups after Various Treatment Steps | | | |
|---|---|---|---|---|
| | Duolite C-3 Effluent | Granular Carbon Effluent | Duolite A-6 Effluent | Amberlite 900 Effluent |
| Color (Corn Refiners Association Incorporated Method F-14 measured at pH of 4.8) | 3.170 | 0.060 | 0.050 | 0.000 |
| Per cent ash dry substance basis (Corn Refiners Association Incorporated Method F-6) | 0.006 | — | — | 0.000 |
| Per cent protein dry substance basis (Corn Refiners Association Incorporated Method F-14) | 0.046 | 0.014 | 0.005 | 0.004 |

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method of purifying an enzymatically isomerized glucose syrup containing fructose having present salts which contribute to the ash content of the syrup, colored bodies, potential color-forming bodies, flavoring materials, and odoriferous materials, comprising treating the syrup with a strong acid cation exchange resin in the hydrogen form which removes a portion of the colored bodies and the metallic constituents of the salts which contribute to the ash content of the syrup, adjusting the pH of the syrup to a value below about 3, subjecting the syrup to a carbon treatment to remove the major portion of the colored bodies, odoriferous materials and flavoring materials, treating the syrup with a weak base anion exchange resin in the free base form to adjust the pH of the syrup upwardly, treating the syrup with a strong acid cation exchange resin in the hydrogen form to remove a portion of the remaining colored bodies and substantially all the remaining metallic constituents of the salts which contribute to the ash content of the syrup, and treating the syrup with a strong base anion exchange resin in the hydroxyl form, said treatments being carried out sequentially and under conditions to provide a syrup which is bland, substantially colorless and odorless.

2. A method of purifying an enzymatically isomerized glucose syrup containing fructose as defined in claim 1, wherein the first treatment with a strong acid cation exchange resin in the hydrogen form adjusts the pH of the syrup to a value below about 3 by hydrogen ion exchange.

3. A method of purifying an enzymatically isomerized glucose syrup containing fructose as defined in claim 2, wherein the weak base anion exchange resin in the free base form adjusts the pH of the syrup to a range of about 3 to about 7.

4. A method of purifying an enzymatically isomerized glucose syrup containing fructose as defined in claim 3, wherein the treatment with the strong base anion exchange resin in the hydroxyl form is performed to remove substantially all the remaining potential color-forming bodies, and odoriferous and flavoring materials from the syrup.

5. A method of purifying an enzymatically isomerized glucose syrup containing fructose as defined in claim 4, wherein the temperature of the syrup during purification is in the temperature range of from about 37° to about 60° C.

6. A method of purifying an enzymatically isomerized glucose syrup containing fructose as defined in claim 5, wherein prior to treatment with a strong acid cation exchange resin the syrup is filtered and the pH of the syrup is adjusted to a value of from about 4 to about 5.

7. A method of purifying an enzymatically isomerized glucose syrup containing fructose as defined in claim 4, wherein the treatments are performed to obtain a purified syrup having a color value below about 0.05 when measured according to the Corn Refiners Association Incorporated Method F-14.

8. A method of purifying an enzymatically isomerized glucose syrup containing fructose as defined in claim 7, wherein the treatments are performed to obtain a purified syrup having a color value below about 0.01 when measured according to the Corn Refiners Association Incorporated Method F–14.

9. A method of purifying an enzymatically isomerized glucose syrup containing fructose as defined in claim 7, wherein the enzymatically isomerized glucose syrup was isomerized by glucose isomerase derived from microorganisms of the *Streptomyces* genus.

10. A method of purifying an enzymatically isomerized glucose syrup containing fructose as defined in claim 9, wherein the enzymatically isomerized glucose syrup was isomerized by glucose isomerase derived from *Streptomyces* sp. ATCC 21175 or *Streptomyces* sp. ATCC 21176.

* * * * *